(12) United States Patent
Strandborg et al.

(10) Patent No.: US 12,254,131 B1
(45) Date of Patent: Mar. 18, 2025

(54) GAZE-ADAPTIVE IMAGE REPROJECTION

(71) Applicant: Varjo Technologies Oy, Helsinki (FI)

(72) Inventors: Mikko Strandborg, Helsinki (FI); Urho Konttori, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/457,699

(22) Filed: Aug. 29, 2023

(51) Int. Cl.
*G06F 3/01* (2006.01)
*G06T 15/20* (2011.01)
*G06T 19/00* (2011.01)

(52) U.S. Cl.
CPC .............. *G06F 3/013* (2013.01); *G06F 3/012* (2013.01); *G06T 15/20* (2013.01); *G06T 19/006* (2013.01)

(58) Field of Classification Search
CPC ......... G06F 3/012; G06F 3/013; G06T 15/20; G06T 19/006
See application file for complete search history.

(56) References Cited

U.S. PATENT DOCUMENTS

| | | | |
|---|---|---|---|
| 2021/0201580 A1* | 7/2021 | Sztuk | G06T 19/006 |
| 2022/0404578 A1* | 12/2022 | Lee | G02B 27/0172 |
| 2023/0037329 A1* | 2/2023 | Erkelens | G06F 3/011 |
| 2023/0130770 A1* | 4/2023 | Miller | G06V 20/20 345/156 |

* cited by examiner

*Primary Examiner* — Ryan A Lubit
(74) *Attorney, Agent, or Firm* — Ziegler IP Law Group, LLC.

(57) ABSTRACT

Disclosed is an imaging system of a display apparatus with gaze-tracking means and processor(s). The processor(s) is/are configured to: process gaze-tracking data, collected by the gaze-tracking means, to detect gaze directions of a user's eyes; determine a gaze convergence distance, based on a convergence of the gaze directions of the user's eyes; identify a region of interest in a given image frame, based on a gaze direction of a given eye of the user from a perspective of which the given image frame is rendered; and generate a reprojected image frame, by reprojecting the region of interest using six degrees-of-freedom reprojection, whilst considering the gaze convergence distance as an optical depth of pixels of the region of interest.

13 Claims, 4 Drawing Sheets

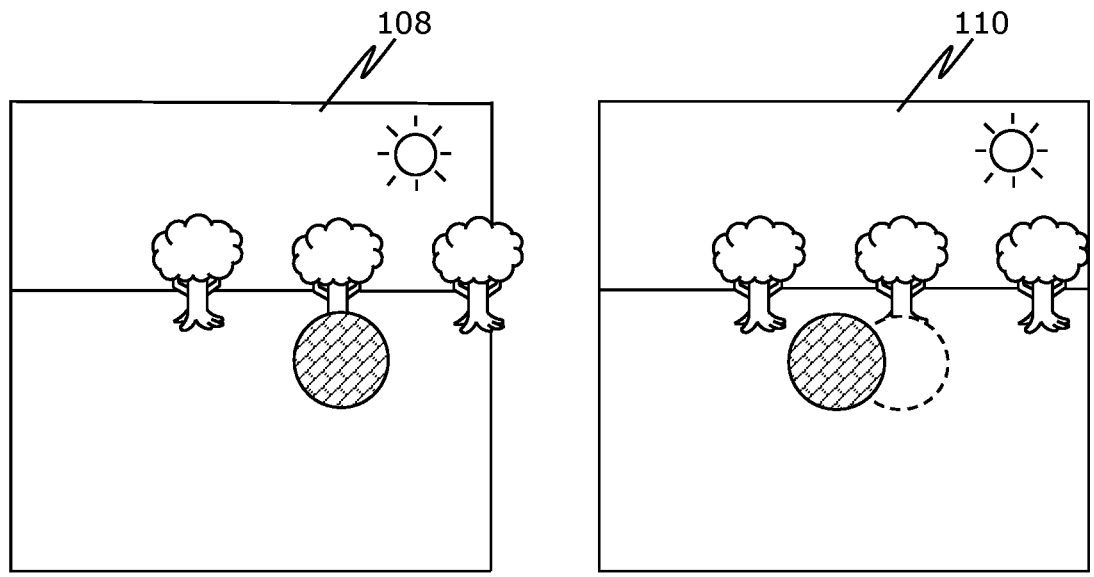
FIG. 1E
(PRIOR ART)
FIG. 1F
(PRIOR ART)
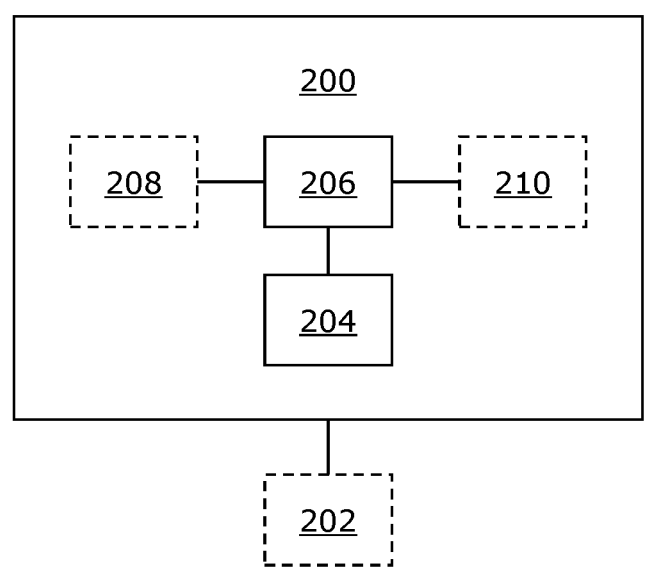
FIG. 2

GAZE-ADAPTIVE IMAGE REPROJECTION

TECHNICAL FIELD

The present disclosure relates to imaging systems of display apparatuses, the imaging systems incorporating gaze-adaptive image reprojection. The present disclosure also relates to the methods incorporating gaze-adaptive image reprojection.

BACKGROUND

In recent times, there has been an ever-increasing demand for pose-consistent image generation. Such a demand may, for example, be quite high and critical in case of evolving technologies such as immersive extended-reality (XR) technologies, which are being employed in various fields such as entertainment, real estate, training, medical imaging operations, simulators, navigation, and the like. Such immersive XR technologies create XR environments for presentation to users of XR devices (such as an XR headsets, pairs of XR glasses, or similar).

Existing equipment and techniques for generating pose-consistent images often employ image reprojection techniques, for example, when there is a delay (such as due to communication network traffic, fluctuations in XR application rendering time, transmission delays, compression-related overheads, and the like) between measurement of a pose of an XR device and generation of an image frame corresponding to said pose. Such image reprojection techniques are well-known in the art.

However, provision of generating image frames using the image reprojection techniques has certain problems associated therewith.

As an example, when the image reprojection techniques perform a three degrees-of-freedom (3DOF) reprojection, only differences between viewing directions of the XR device are taken into account, and any changes in viewing positions of the XR device are completely ignored. In such a case, an image frame is considered as though it were displayed on an infinitely-expansive canvas that is arranged at an infinite distance from a user of the XR device, and thus only a simple three-dimensional (3D) transformation is needed for performing the 3DOF reprojection. Even though such an approach is simple and computationally efficient, it fails to account for the changes in the viewing positions of the XR device, thus an image frame generated upon the 3DOF reprojection lacks realism and immersiveness (for example, in terms of accurately representing any parallax effect). Moreover, when the viewing positions of the XR device change (for example, when the user's orbits/moves around an object present in an XR environment), image frames are displayed at the XR device with considerable stuttering (for example, as said reprojection undershoots the parallax effect) and latency. This results in an unrealistic, non-immersive viewing experience for the user. Furthermore, for performing the 3DOF reprojection, it is assumed that the user's head rotates around an eye socket of the user, which is contradicting to the fact that a head movement of the user generally encompasses both a change in a viewing position of the user's eye and a change in a viewing direction of the user's eye. Even if the user's head rotates around the eye socket, said rotation of the user's head cannot occur for both eyes of the user simultaneously.

As another example, when the image reprojection techniques perform a six degrees-of-freedom (6DOF) reprojection, both changes in the viewing directions and the viewing positions of the XR device are taken into account. Additionally, the 6DOF reprojection utilises depth information (for example, in form of depth maps) and ray marching per pixel. Such an approach addresses the aforesaid limitations associated with the 3DOF reprojection; however, several technical challenges also arise while performing the 6DOF reprojection. Firstly, for rendering purposes (including reprojection), an XR application utilises depth information per pixel (for example, in form of depth maps), which is not always available, for example, in case of cross-platform XR applications (such as OpenVR applications). Secondly, an actual implementation of the 6DOF reprojection is highly computationally-intensive and time-consuming as multiple depth map lookups are required. This is often challenging for remote XR devices having limited processing capabilities. Moreover, even when a single depth map lookup is to be employed, it will still require nearly 5 percent of a total computational time, and a noticeable ripple effect will be observed in reprojected image frames when there are changes in the viewing positions of the XR device. Thirdly, due to the parallax effect and the changes in the viewing positions and the viewing directions of the XR device, some portions of the reprojected image frames have disocclusions (i.e., exposure of hidden areas of a visual scene represented in the reprojected image frames), for which certain post processing operations (such as inpainting, hallucination, or similar) also need to be performed. Moreover, such operations may utilise a three-dimensional (3D) model of the XR environment, which may not always be available to the XR devices having limited processing capabilities. This often results in generation of visible artifacts in a final reprojected image frame. Additionally, due to such post processing operations, an overall processing resource consumption and a processing time also increases.

Referring to FIGS. 1A, 1B, 1C, and 1D, FIG. 1A is a schematic aerial illustration of a perspective of a first pose of an extended-reality (XR) device 100 from which a visual scene of an XR environment is to be generated, FIG. 1B is a schematic aerial illustration of a perspective of a second pose of the XR device 100 to which the (same) visual scene of the XR environment is to be reprojected, FIG. 1C illustrates an image frame 104 generated corresponding to the first pose of the XR device 100, while FIG. 1D (that represents prior art) illustrates an ideal reprojected image frame 106 generated by reprojecting said image frame 104.

With reference to FIGS. 1A and 1B, the visual scene comprises objects 102a, 102b, and 102c depicted, for example, as a ball, trees, and the Sun, respectively, present in the XR environment. There will now be considered that a gaze direction of a given eye of a user of the XR device 100 is directed towards the object 102a, and the user moves her/his head around whilst orbiting the object 102a.

With reference to FIG. 1A, the object 102a lies at a center of a field of view of the user of the XR device 100. With reference to FIG. 1B, the object 102a lies towards a left-side region of the field of view of the user of the XR device 100, as a pose of a user's head changes (i.e., when the user is orbiting around the object 102a). With reference to FIG. 1C, the generated image frame 104 represents objects 102a-c from the perspective of the first pose of the XR device 100. With reference to FIG. 1D, the ideal reprojected image frame 106 is generated by reprojecting said image frame using six degrees-of-freedom (6DOF) reprojection whilst employing inpainting (for example, using a 3D model of the XR environment) for reconstructing disocclusions in the ideal reprojected image frame, i.e., an ideal scenario of performing the aforesaid reprojection. This is feasible when said reprojection is performed at a server side, and is often challenging to be performed by the XR device 100 which has limited processing capabilities. The ideal reprojected image frame 106 represents objects 102a-c from the perspective of the second pose of the XR device 100 in a highly realistic and accurate manner.

Referring to FIG. 1E (that represents prior art), illustrated is a reprojected image frame 108 generated by reprojecting the image frame 104 (depicted in FIG. 1C) using a three degrees-of-freedom (3DOF) reprojection. The reprojected image frame 108 is generated by taking into account that the gaze direction of the given eye of the user of the XR device 100 is directed towards the object 102a (namely, an object of interest). The 3DOF reprojection is performed by considering the objects 102a-b to be at an infinite distance from user's eyes. Upon comparing said reprojected image frame 108 with the ideal reprojected image frame 106 (as depicted in FIG. 1D), it can be inferred that the objects 102a-b represented in the reprojected image frame 108 appear to be shifted towards a right-side of the field of view of the user. Moreover, the 3DOF reprojection is more accurately and suitably performed for objects (such as the object 102c) that are considerably far from the user's eyes, and is less accurately performed for objects (such as the objects 102a-b) that are near the user's eyes. In such a case, the reprojected image frame 108 and other such reprojected image frames are displayed to the user with considerable stuttering as a movement of the object 102a-b appears to be jerky.

Referring to FIG. 1F (that represents prior art), illustrated is a reprojected image frame 110 generated by reprojecting the image frame 104 (as depicted in FIG. 1C) using a six degrees-of-freedom (6DOF) reprojection. The reprojected image frame 110 is generated by taking into account that the gaze direction of the given eye of the user of the XR device 100 is directed towards the object 102a (namely, an object of interest). Upon comparing said reprojected image frame 110 with the ideal reprojected image frame 106 (as depicted in FIG. 1D), it can be inferred that the 6DOF reprojection correctly reproduces a parallax effect in said reprojected image frame 110 (without any need for performing inpainting operation), and the objects 102a-c are reprojected correctly (with less to negligible stuttering) as compared to when the 3DOF reprojection is used. However, due to the parallax effect, a portion (depicted using a dashed circle) in the reprojected image frame has a disocclusion, which results in generation of a visible artifact in said reprojected image frame 110.

Therefore, in light of the foregoing discussion, there exists a need to overcome the aforementioned drawbacks.

SUMMARY

The present disclosure seeks to provide an imaging system and a method for generating gaze-consistent, high-quality, and realistic reprojected image frames without using any per-pixel depth information, in a computationally-efficient and a time-efficient manner. The aim of the present disclosure is achieved by a system and a method which incorporates gaze-adaptive image reprojection, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 2 illustrates a block diagram of an architecture of an imaging system of a display apparatus, the imaging system incorporating gaze-adaptive image reprojection, in accordance with an embodiment of the present disclosure;

DETAILED DESCRIPTION OF EMBODIMENTS

Figure 1A:
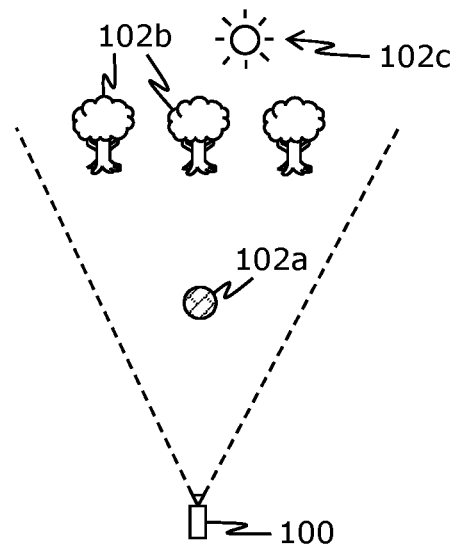
FIG. 1A is a schematic aerial illustration of a perspective of a first pose of an extended-reality (XR) device from which a visual scene of an XR environment is to be generated.
Figure 1B:
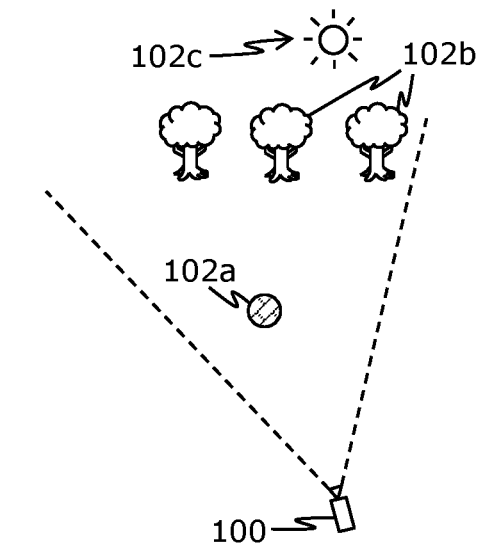
FIG. 1B is a schematic aerial illustration of a perspective of a second pose of the XR device to which the visual scene of the XR environment is to be reprojected.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system of a display apparatus comprising:

gaze-tracking means; and at least one processor configured to:

process gaze-tracking data, collected by the gaze-tracking means, to detect gaze directions of a user's eyes;

determine a gaze convergence distance, based on a convergence of the gaze directions of the user's eyes;

identify a region of interest in a given image frame, based on a gaze direction of a given eye of the user from a perspective of which the given image frame is rendered; and generate a reprojected image frame, by reprojecting the region of interest using six degrees-of-freedom (6DOF) reprojection, whilst considering the gaze convergence distance as an optical depth of pixels of the region of interest.

In a second aspect, an embodiment of the present disclosure provides a method comprising:
- processing gaze-tracking data, collected by gaze-tracking means, to detect gaze directions of a user's eyes;
- determining a gaze convergence distance, based on a convergence of the gaze directions of the user's eyes;
- identifying a region of interest in a given image frame, based on a gaze direction of a given eye of the user from a perspective of which the given image frame is rendered; and
- generating a reprojected image frame, by reprojecting the region of interest using six degrees-of-freedom (6DOF) reprojection, whilst considering the gaze convergence distance as an optical depth of pixels of the region of interest.

The present disclosure provides the aforementioned imaging system and the aforementioned method for generating gaze-consistent, high-quality, and realistic reprojected image frames without using any per-pixel depth information, in a computationally-efficient and a time-efficient manner. In other words, the aforesaid system and method achieve these technical benefits even when depth information (for example, a depth map) is not available. Notably, these technical benefits are achieved based on a fact that the pixels of the region of interest are gaze-contingent pixels (that represent gaze-contingent objects) and, therefore, the gaze convergence distance is considered as the optical depth of such pixels for applying the 6DOF reprojection. Even though the 6DOF reprojection conventionally utilizes depth information in a per-pixel manner, in the aforementioned system and method, the 6DOF reprojection is applied based on the gaze convergence distance, without using any per-pixel depth information. In other words, the 6DOF reprojection is performed by considering objects (or their parts) represented by the pixels of the region of interest to be at the gaze convergence distance. As a result, the reprojected image frame is generated in a computationally-efficient and a time-efficient manner, as compared to when it would have been generated using a typical 6DOF reprojection which utilizes depth information in a per-pixel manner. Processing power requirements for performing the 6DOF reprojection in the aforesaid manner is similar to as that of performing a 3DOF projection. Moreover, since objects (or their portions) represented in the region of interest are originally at the gaze convergence distance only, the aforesaid reprojection is realistically and accurately performed such that the reprojected image frame would be perceived with considerable realism and immersiveness. For example, the reprojected image frame may accurately represent a parallax effect that occurs due to any change in a viewing perspective. This may, for example, be particularly beneficial in a scenario where the user is orbiting around a given object.

It is particularly important to note that when the reprojected image frame is displayed to the user, the user focuses only on a region of the reprojected image frame that corresponds to the region of interest (of the given image frame); therefore, any skewness (namely, stuttering) in a remaining region of the reprojected image frame is imperceptible (i.e., unnoticeable) to the user. Therefore, reprojecting only the region of interest of the given image frame according to the gaze convergence distance is sufficient for producing a realistic and immersive view for the user. This may potentially save processing resources and processing time of the at least one processor. Moreover, the imaging system and the method facilitate in minimizing stuttering, when displaying the reprojected image at the display apparatus. The 6DOF reprojection performed in the aforesaid manner can be referred to as a pseudo-6DOF reprojection, as it only utilizes a singular piece of depth information (namely, the gaze convergence distance) and reconstructs a very crude depth map in which optical depths of the pixels of the region of interest are assumed to equal to the gaze convergence distance. The imaging system and the method are simple, robust, support real-time and reliable gaze-adaptive reprojection, and can be implemented with ease.

Throughout the present disclosure, the term "display apparatus" refers to a specialized equipment that is capable of displaying images. These images are to be presented to a user of the display apparatus. It will be appreciated that the term "display apparatus" encompasses a head-mounted display (HMD) device and optionally, a computing device communicably coupled to the HMD device. The term "head-mounted display" device refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. Examples of the computing device include, but are not limited to, a laptop, a desktop, a tablet, a phablet, a personal digital assistant, a workstation, and a console. The term "extended-reality" encompasses virtual reality (VR), augmented reality (AR), mixed reality (MR), and the like. The imaging system could be integrated with the display apparatus (for example, the HMD device), or could be remotely located from the display apparatus.

Notably, the at least one processor controls an overall operation of the imaging system. The at least one processor is communicably coupled to the gaze-tracking means. It will be appreciated that the term "at least one processor" refers to "a single processor" in some implementations, and to "a plurality of processors" in other implementations. When the imaging system comprises the single server, all operations of the imaging system can be performed by the single server. When the imaging system comprises the plurality of processors, different operations of the imaging system can be performed by different (and specially configured) processors from amongst the plurality of processors. As an example, a first processor from amongst the plurality of processors may be configured to process the gaze-tracking data to detect the gaze directions, and a second processor from amongst the plurality of processors may be configured to generate the reprojected image frame.

Throughout the present disclosure, the term "gaze-tracking means" refers to specialized equipment for detecting and/or following gaze of the user's eyes, when the display apparatus (for example, the HMD device) in operation is worn by the user. The gaze-tracking means could be implemented as contact lenses with sensors, cameras monitoring a position, a size and/or a shape of a pupil of a given eye of the user, and the like. The gaze-tracking means are well-known in the art.

It will be appreciated that the gaze-tracking data is collected repeatedly by the gaze-tracking means throughout a given session of using the display apparatus, as gaze of the user's eyes keeps changing whilst he/she uses the display apparatus. Optionally, when processing the gaze-tracking data, the processor is configured to employ at least one of: an image processing algorithm, a feature extraction algorithm, a data processing algorithm. Determining the gaze directions of the user's eye allows the at least one processor to track where the user is looking/gazing. Processing the gaze-tracking data to determine the gaze directions of the user's eyes is well-known in the art.

Throughout the present disclosure, the term "gaze convergence distance" refers to a distance from the user's eyes to a point at which the gaze directions of the user's eyes converge. In other words, the gaze convergence distance represents an optical depth at which the user is gazing. It will be appreciated that since an angle of convergence of the gaze directions of the user's eyes, an interpupillary distance (IPD) of the user's eyes, a point of convergence of said gaze directions (namely, a gaze position) are already known to the at least one processor, the gaze convergence distance can be easily determined by the at least one processor, for example, using at least one mathematical technique. The at least one mathematical technique could be at least one of: a triangulation technique, a geometry-based technique, a trigonometry-based technique. The IPD of the user's eyes can be an average IPD. Determining the gaze convergence distance, based on the convergence of the gaze directions is well-known in the art.

Throughout the present disclosure, the term "region of interest" refers to a region (namely, a portion) of the given image frame whereat the user is focusing or is more likely to focus. In other words, the region of interest is a fixation region within the given image frame. Notably, the region of interest has visual representation that is more noticeable and prominent, as compared to visual representation in remaining region(s) of the given image frame. In such a case, objects lying within the region of interest (i.e., gaze-contingent objects) are focused onto foveae of the user's eyes, and are resolved to a much greater detail as compared to remaining object(s) lying outside the region of interest. It will be appreciated that the user is more likely to focus on a region of the given image frame that represents, for example, such as a salient feature (namely, a visually alluring feature), a moving object, or a virtual object. For example, the user is more likely to focus on an edge, a corner, or a high-frequency texture detail as compared to interior features or low-frequency texture detail. The user may also more likely to focus on a central region in the given image frame.

It will be appreciated that the region of the interest may have a well-shaped boundary that resembles any of a circle, a polygon, an ellipse, and the like. Alternatively, the region of the interest may have a freeform-shaped boundary i.e., a boundary that does not resemble any specific shape. Optionally, an angular extent of the region of the interest lies in a range of 0 degrees from the gaze position to 2-50 degrees from the gaze position.

Optionally, when identifying the region of interest in the given image frame, the at least one processor is configured to map the gaze directions of the user's eyes onto the given image frame. The region of interest could, for example, be at a centre of a field of view of the given image frame, be a top-left region of said field of view, a bottom-right region of said field of view, or similar. It will be appreciated that as the user's gaze keeps changing, the region of interest in the given image frame also changes accordingly.

Optionally, at least one server is configured to render the given image frame from the perspective of the given eye of the user. In this regard, the at least one server is configured to execute a rendering application to generate image data corresponding to the given image frame, based on the perspective of the given eye. Moreover, when the information pertaining to the gaze directions of the user's eyes is optionally sent to the at least one server, objects (or their parts) represented in the region of interest are originally rendered according to the gaze convergence distance during rendering of the given image frame. Optionally, the rendering application is an XR application. Image data and rendering application are well-known in the art.

In some implementations, the at least one server is implemented as a remote server. In an example, the remote server could be a cloud server that provides a cloud computing service, and could be arranged in a geographical location that is different from a geographical location of the imaging system. In other implementations, the at least one server is implemented as the processor of the computing device that is communicably coupled to the HMD device.

In one implementation, the given image frame may be a visual representation of an XR environment from the perspective of the given eye of the user, wherein said visual representation is generated by the at least one server, for example, using a three-dimensional (3D) model of the XR environment (as discussed hereinbelow). In other implementations, the given image frame may represent at least one virtual object that is to be embedded on a video-see-through (VST) image captured by at least one camera of the imaging system, for subsequently generating an MR image (as discussed later).

The term "visual representation" encompasses colour information represented in the given image frame, and additionally optionally other attributes associated with the given image frame (for example, such as depth information, luminance information, transparency information (namely, alpha values), polarization information, and the like). Optionally, the colour information represented in the given image frame is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

Optionally, the at least one server is configured to obtain the 3D model from at least one data repository that is communicably coupled to the at least one server. In such a case, the 3D model is pre-generated (for example, by the at least one server), and pre-stored at the at least one data repository. It will be appreciated that the at least one data repository could be implemented, for example, such as a memory of the at least one server, a memory of the computing device, a memory of the imaging system, a memory of the display apparatus, a removable memory, a cloud-based database, or similar. Optionally, the imaging system further comprises the at least one data repository.

Herein, the term "three-dimensional model" of the XR environment refers to a data structure that comprises comprehensive information pertaining to objects or their parts present in the XR environment. Such comprehensive information is indicative of at least one of: surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within the XR environment. The term "object" refers to a physical object or a part of the physical object that is present in the XR environment. An object could be a living object (for example, such as a human, a pet, a plant, and the like) or a non-living object (for example, such as a wall, a building, a shop, a road, a window, a toy, a poster, a lamp, and the like). Examples of the plurality of features include, but are not limited to, edges, corners, blobs, a high-frequency feature, a low-frequency feature, and ridges.

Optionally, the 3D model of the XR environment is in a form of at least one of: a 3D polygonal mesh, a 3D point cloud, a 3D surface cloud, a 3D surflet cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. The aforesaid forms of the 3D model are well-known in the art.

Optionally, when generating the given image frame, the at least one server is configured to utilise the 3D model of the XR environment. Optionally, in this regard, the at least one server is configured to employ at least one data processing algorithm. The at least one data processing algorithm would enable in transforming a 3D point in said 3D model to a 2D point in the given image frame, from the perspective of the given eye of the user. Optionally, the at least one data processing algorithm is at least one of: an image synthesis algorithm (such as an RGB-D image synthesis algorithm), a view synthesis algorithm, a rendering algorithm. Such data processing algorithms are well-known in the art. In an example, when the 3D model is in the form of a 3D polygonal mesh (for example, such as a 3D triangular mesh), the image synthesis algorithm may be a triangle rasterization algorithm. In another example, when the 3D model is in the form of a voxel-based model (such as a Truncated Signed Distance Field (TSDF) model), the image synthesis algorithm may be a ray-marching algorithm. In yet another example, when the 3D model is in the form of a 3D point cloud, the rendering algorithm may be a point cloud rendering algorithm, a point cloud splatting algorithm, an elliptical weighted-average surface splatting algorithm, or similar.

Optionally, prior to utilising the 3D model of the XR environment, the at least one server is configured to generate the 3D model from a plurality of visible-light images and a plurality of depth images (corresponding to the plurality of visible-light images), based on corresponding poses from perspectives of which the plurality of visible-light images and the plurality of depth images are captured. Techniques for generating the 3D model are well-known in the art. The 3D model could be generated prior to a given session of using the imaging system (or the display apparatus). Optionally, the 3D model is generated in the global coordinate space.

Throughout the present disclosure, the term "reprojected image frame" refers to an image frame that is generated upon reprojecting at least a region (for example, the region of interest) in the given image frame. Furthermore, typically, the "6DOF reprojection" is an image reprojection that is performed by taking into account both changes in viewing directions (namely, orientations or rotations) of the display apparatus and changes in the viewing positions of the display apparatus, when said display apparatus is in use. In addition to this, the 6DOF reprojection may also utilise depth information (for example, in form of depth maps) and ray marching/iterative image warping approaches, and requires multiple texture lookups per pixel. Reprojection algorithms for performing the 6DOF reprojection are well-known in the art.

Since the pixels of the region of interest are gaze-contingent pixels (that represent gaze-contingent objects) and depth information pertaining to the pixels of the region of interest (with respect to the user's eyes) is not available to the at least one processor, so considering the gaze convergence distance as the optical depth of such pixels is rather beneficial when applying the 6DOF reprojection (which typically utilizes depth information in a per-pixel manner). Therefore, the 6DOF reprojection is performed by considering objects (or their parts) represented by the pixels of the region of interest to be at the gaze convergence distance, and object(s) represented by remaining pixels in the given image frame (i.e., pixels lying outside the region of interest) to be at an infinite distance from the user's eyes. As a result, the reprojected image frame is generated in a computationally-efficient and a time-efficient manner, as compared to when it would have been generated using a typical 6DOF reprojection which utilizes depth information in a per-pixel manner. Moreover, since objects (or their portions) represented in the region of interest are originally at the gaze convergence distance only, the aforesaid reprojection is realistically and accurately performed such that the reprojected image frame would be perceived with considerable realism and immersiveness. For example, the reprojected image frame may accurately represent a parallax effect that occurs due to any change in a viewing perspective. This may, for example, be beneficial in a scenario where the user is orbiting around a given object. In addition to this, upon said reprojection, when the reprojected image frame is displayed to the user, the user would typically focus only on a region of the reprojected image frame that corresponds to the region of interest (of the given image frame), and any skewness (namely, stuttering) in a remaining region of the reprojected image frame is imperceptible (i.e., unnoticeable) to the user. Therefore, only reprojecting the region of interest of the given image frame according to the gaze convergence distance is sufficient. This may potentially save processing resources and processing time of the at least one processor. It will be appreciated that the 6DOF reprojection performed in the aforesaid manner can be referred to as a pseudo-6DOF reprojection, as it only utilizes a singular piece of depth information (namely, the gaze convergence distance) and reconstructs a very crude depth map in which optical depths of all the pixels of the region of interest are assumed to equal to the gaze convergence distance.

Optionally, upon generating the reprojected image frame, the at least one processor is configured to display the reprojected image frame, for example, via at least one light source of the display apparatus. The term "light source" refers to an element from which light emanates. Optionally, the at least one light source is implemented as a display or a projector. Displays and projectors are well-known in the art.

In an embodiment, when generating the reprojected image frame, the at least one processor is configured to reproject a remaining region of the given image frame also using the 6DOF reprojection, whilst considering the gaze convergence distance as an optical depth of pixels of the remaining region. In this regard, instead of only reprojecting the region of interest, an entirety of the given image frame is reprojected using the 6DOF reprojection. Thus, the 6DOF reprojection is performed also on the remaining region by considering objects (or their portions) represented by the pixels of the remaining region to be at the gaze convergence distance, in a similar manner as discussed earlier with respect to the region of interest. It is to be understood that the pixels of the remaining region are non-gaze-contingent pixels (that represent objects (or their portions) lying outside the region of interest) and depth information pertaining to the pixels of the remaining region (with respect to the user's eyes) is also not available to the at least one processor. Moreover, since the objects represented in the remaining region are not originally at the gaze convergence distance unlike the objects represented in the region of interest, thus the 6DOF reprojection is not much realistically and accurately performed for the remaining region, as compared to the region of interest. However, as discussed earlier, when the reprojected image frame is displayed to the user, the user would typically focus only on the region of the reprojected image frame that corresponds to the region of interest, and not on a remaining region of the reprojected image frame (that corresponds to the remaining region of the given image frame). Thus, upon performing the 6DOF reprojection on the entirety of the given image frame to generate the reprojected image frame, an overall image quality of the reprojected image frame would still be high, even when the remaining region of the reprojected image frame would be perceived with reduced realism and immersiveness, as compared to the region of the reprojected image frame that corresponds to the region of interest of the given image frame.

In another embodiment, when generating the reprojected image frame, the at least one processor is configured to reproject a peripheral region of the given image frame using three degrees-of-freedom (3DOF) reprojection, the peripheral region surrounding the region of interest. In this regard, instead of performing the 6DOF reprojection on the entirety of the given image frame (as discussed hereinabove), the 3DOF reprojection is performed on the peripheral region surrounding the region of interest. It is to be understood that the pixels of the peripheral region are non-gaze-contingent pixels (that represent objects (or their portions) lying outside the region of interest). Typically, the "3DOF reprojection" is an image reprojection that is performed by taking into account only differences between the viewing directions of the display apparatus, without taking into consideration any changes in the viewing positions of the display apparatus, when said display apparatus is in use. Such an approach is relatively fast and simple (as compared to the 6DOF reprojection) because it involves a straightforward texture lookup without any need for performing complex searching or employing ray marching algorithms. The 3DOF reprojection is performed by simply considering objects (or their portions) represented by the pixels of the peripheral region to be at an infinite distance from the user's eyes. Reprojection algorithms for performing the 6DOF reprojection are well-known in the art. It is to be understood that the 6DOF reprojection is relatively more accurate, but is slightly computationally intensive as compared to the 3DOF reprojection. Moreover, similar to what has been discussed earlier, when the reprojected image frame is displayed to the user, the user would typically focus only on the region of the reprojected image frame that corresponds to the region of interest, and not on a remaining region of the reprojected image frame (that corresponds to the peripheral region of the given image frame). Thus, the 3DOF reprojection is sufficient enough to be performed on the peripheral region, instead of performing the 6DOF reprojection which would not be beneficial (for example, in terms of saving processing time and reducing consumption of processing resources of the at least one processor). Furthermore, upon performing the 3DOF reprojection on the peripheral region (and the 6DOF reprojection on the region of the interest), an overall image quality of the reprojected image frame would still be high, even when the remaining region of the reprojected image frame would be perceived with realism and immersiveness, as compared to the region of the reprojected image frame that corresponds to the region of interest.

It will be appreciated that the remaining region of the given image frame or the peripheral region of the given image frame is a region of the given image frame that remains after excluding the region of interest. Optionally, an angular extent of the remaining region of the given image frame or the peripheral region of the given image frame lies in a range of 12.5-50 degrees from the gaze position to 45-110 degrees from the gaze position. It will also be appreciated that the region of interest and any one of: the remaining region of the given image frame, the peripheral region of the given image frame, are optionally identified dynamically, based on the gaze directions of the user's eyes. Such a dynamic manner of identifying the region of interest and any one of: the remaining region of the given image frame, the peripheral region of the given image frame, emulates a way in which the user actively focuses within his/her field of view.

Optionally, when generating the reprojected image frame, the at least one processor is configured to:
  for a given pixel of an intermediate region of the given image frame that lies between the region of interest and the peripheral region, interpolate between zero and a reciprocal of the gaze convergence distance, to generate a reciprocal of an interpolated distance; and
  reproject the intermediate region using the 6DOF reprojection, whilst considering interpolated distances as respective optical depths of pixels of the intermediate region.

In this regard, there may be an instance when a difference between a visual quality of the region of the reprojected image frame (that corresponds to the region of interest) and a visual quality of the remaining region of the reprojected image frame (that corresponds to the the peripheral region) is considerably drastic (namely, too abrupt), upon performing reprojection. Thus, in such an instance, a transition (namely, a boundary) between the two aforesaid regions of the reprojected image frame may be clearly recognizable (namely, perceivable) by the user, when the reprojected image frame is displayed to the user, and a viewing experience of the user would be unrealistic and non-immersive. Therefore, in order to circumvent this potential problem, the intermediate region of the given image frame is optionally determined in between the region of interest and the peripheral region. Optionally, a width of the intermediate region lies in a range of 1 pixel to 300 pixels. It will be appreciated that alternatively, the width of the intermediate region may be expressed in terms of degrees, for example, lying in a range of 1 degree to 15 degrees.

Furthermore, when the intermediate region is reprojected using the 6DOF reprojection whilst considering the interpolated distances, a visual quality of an intermediate region of the reprojected image frame (that corresponds to the intermediate region of the given image frame) would become considerably higher as compared to the remaining region of the reprojected image frame. This is due to the fact that the 6DOF reprojection is relatively more accurate and ensures realistic reprojection, as compared to the 3DOF that is performed on the peripheral region of the given image frame. Advantageously, in such a case, the intermediate region of the reprojected image frame provides a smooth transition (namely, gradual blending or fusion) between said region and the remaining region of the reprojected image frame, and thus said region of the reprojected image frame would appear to be well-blended with the remaining region of the reprojected image frame, upon reprojection. This improves immersiveness and realism of user's viewing experience when the reprojected image frame is displayed to the user.

It will be appreciated that since depth information pertaining to the pixels of the intermediate region (with respect to the user's eyes) is not available to the at least one processor, interpolating in the aforesaid manner between zero and the reciprocal of the gaze convergence distance is beneficial when applying the 6DOF reprojection. The reason that the interpolation is performed between zero and the reciprocal of the gaze convergence distance is because objects (or their portions) represented by the pixels of the peripheral region are considered to be at an infinite distance from the user's eyes, and a reciprocal of the infinite distance is zero. It is to be noted that it would not be beneficial to interpolate between the gaze convergence distance and an infinite distance, because a result for such an interpolation would be an infinite value only, and thus the 3DOF reprojection would be performed instead of performing the 6DOF reprojection. Optionally, when interpolating between zero and the reciprocal of the gaze convergence distance, the at least one processor is configured to employ an interpolation algorithm. Such an interpolation algorithm may be based on a linear interpolation or a non-linear interpolation. As an example, when the gaze convergence distance is 2 meters, the reciprocal of the interpolated distance may be generated by interpolating between zero and ½. It will also be appreciated that the at least one processor need not necessarily generate the interpolated distances in a pixel-by-pixel manner, and a same interpolated distance could be used for all the pixels in the intermediate region of the given image frame. This may potentially save the processing resources and the processing time of the at least one processor. Alternatively, the interpolated distances could be different for different pixels in the intermediate region, based on a distance of the given pixel of the intermediate region of the given image frame from the gaze position, as described hereinbelow.

Optionally, the at least one processor is configured to:
  determine a gaze position in the given image frame based on the gaze direction of the given eye; and
  interpolate between zero and the reciprocal of the gaze convergence distance based on a distance of the given pixel from the gaze position in the given image frame, to generate the reciprocal of the interpolated distance for the given pixel of the intermediate region.

Optionally, when identifying the gaze position in the given image frame, the at least one processor is configured to map the gaze direction of the given eye onto the given image frame. The term "gaze position" refers to a position in the given image frame onto which the gaze direction of the given eye is mapped. The gaze position may, for example, be at a centre of the given image frame, at a point in a top-left region of the given image frame, at a point in a bottom-right region of the given image frame, or similar.

Furthermore, greater the distance of the given pixel from the gaze position in the given image frame, farther is the given pixel from the region of interest, and lesser is the probability of the user's eyes to focus on an object or its portion represented the given pixel, and vice versa. In addition to this, greater the distance of the given pixel from the gaze position, greater is the interpolated distance for the given pixel, and vice versa. In a such case, instead of performing the 6DOF reprojection for an entirety of the pixels of the intermediate region as discussed earlier, the at least one processor can selectively perform the 6DOF reprojection only for those pixels of the intermediate region that are relatively near the region of interest, as compared to remaining pixels of the intermediate region. The at least one processor is optionally configured to perform the 3DOF reprojection on the remaining pixels of the intermediate region. As an example, the 6DOF reprojection is performed for pixels in the intermediate region lie within a given radius from the gaze position, while the 3DOF reprojection is performed for remaining pixels in the intermediate region lie outside the given radius from the gaze position. This may, for example, be beneficial in a scenario when the gaze convergence distance is less, as objects or their portions that lie far from the user's eyes exhibit more stuttering than objects or their portions that lie near the user's eyes, for an image frame generated without employing reprojection. Thus, it is not beneficial to perform the 6DOF reprojection for pixels that are far from the region of interest, as object(s) represented by such pixels would not be perceived by the user's eyes at all. This may also potentially save the processing resources and the processing time of the at least one processor, whilst ensuring generation of the reprojected image frame in a realistic and an accurate manner. The distance of the given pixel from the gaze position could be an angular distance or a distance measured in terms of number of pixels.

Optionally, the imaging system further comprises at least one camera, wherein the given image frame represents at least one virtual object, and wherein the at least one processor is configured to:
  capture, via the at least one camera, an image of a real-world environment in which the display apparatus is being used; and
  superimpose the at least one virtual object as represented in the reprojected image frame over the captured image, for display at the display apparatus.

The term "camera" refers to an equipment that is operable to detect and process light signals received from the real-world environment, so as to capture the image of the real-world environment. Such an image may, for example be, a VST image in case of the HMD device, as described earlier. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LIDAR) camera, a Time-of-Flight (ToF) camera, a Sound Navigation and Ranging (SONAR) camera, a laser rangefinder, a stereo camera, a plenoptic camera, and an infrared (IR) camera. As an example, the at least one camera may be implemented as the stereo camera.

Furthermore, optionally, prior to superimposing the at least one virtual object over the captured image (namely, in a case of generating the MR image as discussed earlier), the at least one processor is configured to reproject the at least one virtual object represented in the given image frame to generate the reprojected image frame, in a similar manner as discussed earlier. Moreover, when generating the given image frame, the at least one server is configured to employ at least a virtual object generation algorithm. The term "virtual object" refers to a computer-generated object (namely, a digital object). Examples of the at least one virtual object may include, but are not limited to, a virtual navigation tool (such as a virtual map), a virtual gadget, a virtual entity (such as a virtual person, a virtual animal, a virtual ghost, and the like), and a virtual vehicle or part thereof (such as a virtual car, a virtual cockpit, and so forth). Optionally, when superimposing the at least one virtual object, the at least one processor is configured to digitally embed the at least one virtual object over the captured image, for generating the MR image.

Optionally, the at least one processor is configured to detect a boundary of at least one object that is at least partially represented in the region of interest in the given image frame,
wherein when generating the reprojected image frame, the at least one processor is configured to reproject a region of the given image frame lying inside the detected boundary of the at least one object, but lying outside the region of interest, also using the 6DOF reprojection, whilst considering the gaze convergence distance as an optical depth of pixels of said region.

In this regard, any part of the at least one object that lies outside the region of interest can also be reprojected using the 6DOF reprojection, in a similar manner as discussed earlier. The technical benefit of this is that the at least one object would not appear distorted in the reprojected image frame, and when the reprojected image frame is displayed to the user and the user focusses on the region of the reprojected image frame that corresponds to the region of interest, he/she may also be likely to notice the at least one object that is at least partially represented in the region of interest. In this way, a viewing experience of the user would become more immersive and realistic.

Optionally, when detecting the boundary of the at least one object, the at least one processor is configured to employ at least one of: an edge detection algorithm, a contour detection algorithm, a neural network-based algorithm. The aforesaid algorithms for detecting the boundary of the at least one object are well-known in the art. Upon detecting the boundary of the at least one object, the region of the given image frame that lies inside the detected boundary, but lies outside the region of interest can be easily and accurately determined by the at least one processor.

Optionally, the imaging system further comprises pose-tracking means, wherein the at least one processor is configured to:
process pose-tracking data, collected by the pose-tracking means, to determine at least one of: a displacement in a head pose of the user, a velocity with which the head pose is changing; and
update the gaze convergence distance, based on the at least one of: the displacement in the head pose, the velocity with which the head pose is changing.

The term "pose-tracking means" refers to specialized equipment that is employed to detect and/or follow a pose of the display apparatus, when the display apparatus is in use. The term "pose" encompasses position and/or orientation. Optionally, the pose-tracking means is employed to track a head pose of the user, when the display apparatus (for example, the HMD device) is worn by the user on his/her head. Thus, in such a case, the head pose of the user changes according to a change in the pose of the display apparatus. Pursuant to embodiments of the present disclosure, the pose-tracking means is implemented as a true sixDegrees of Freedom (6DoF) tracking system. In other words, the pose-tracking means tracks both position and orientation of the display apparatus within a 3D space of the real-world environment. In particular, said pose-tracking means is configured to track translational movements (namely, surge, heave and sway movements) and rotational movements (namely, roll, pitch and yaw movements) of the display apparatus within the 3D space. The pose-tracking means could be implemented as at least one of: an optics-based tracking system (which utilizes, for example, infrared beacons and detectors, infrared cameras, visible-light cameras, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). The pose-tracking means are well-known in the art.

Optionally, the at least one processor is configured to employ at least one data processing algorithm to process the pose-tracking data, to determine the pose of the display apparatus. The pose-tracking data may be in the form of images, IMU/TIMU values, motion sensor data values, magnetic field strength values, or similar. Examples of the at least one data processing algorithm include, but are not limited to, a feature detection algorithm, an environment mapping algorithm, and a data extrapolation algorithm. Optionally, when determining the displacement in the head pose of the user, the at least one processor is configured to process the pose-tracking data collected over a period of time to determine poses of the display apparatus for two consecutive time instants; and calculate a difference between said poses as the displacement in the head pose. The displacement can be an angular displacement or a linear displacement in the head pose. Optionally, when determining the velocity with which the head pose is changing, the at least one processor is configured to determine a rate of change of the displacement in the head pose within the given time period. In this regard, the at least one processor is configured to determine the displacement in the head pose, and then divide said displacement by a difference between the two consecutive time instants, in order to obtain the velocity in a particular direction. The velocity can be an angular velocity or a linear velocity with which the head pose is changing. It will be appreciated that an overall effect of the displacement and the velocity in updating the gaze convergence distance is fairly less, for example, when the gaze-tracking means measures the user's gaze at 1000 Hertz.

Further, in order to update (namely, to increase or decrease) the gaze convergence distance, the at least one processor is configured to determine whether the displacement in the head pose is in a forward direction or in a backward direction. This can be determined, for example, by analyzing a sign of a value of the displacement. For example, for the linear displacement, when a change in a position of the user's head along an axis is positive, it indicates the displacement is the forward direction along said axis. When a change in the position of the user's head along an axis is negative, it indicates the displacement is the backward direction along said axis. In an example, when the displacement of the head pose is in the forward direction, i.e., when the user moves forward (which most likely means that the user is now closer to the region of interest as compared to when the gaze convergence distance was determined previously), the gaze convergence distance is reduced by an amount of displacement in the forward direction. This may, for example, be beneficial in a scenario when executing ultra-low-framerate XR applications. In this regard, when the user's head is moving towards or away from the visual scene, the reprojected image frame is zoomed in or zoomed out, respectively. This causes the human vision system to change its optical focus distance as a part of a smooth pursuit of the object being focused by the user. When the reprojection of the given image frame continues to occur several times before a new/subsequent image frame is generated, it causes an undesired feedback loop that could be avoided by updating the gaze convergence distance in the aforesaid manner. Furthermore, typically, the gaze convergence distance can only be reliably determined up to about 2 meters (due to limitations in gaze-tracking accuracy), and determining the gaze convergence distance greater than 2 meters would have high error margins. Thus, in order to overcome this issue, the gaze convergence distance may be updated in a manner that when the gaze convergence distance approaches 2 meters, it would be updated to approach infinity (thus, falling back to performing the 3DOF reprojection). Moreover, in order to prevent stuttering when displaying the reprojected image frame, a temporal low-pass filter could be applied to the gaze convergence distance across a sequence of generated image frames. The fact that the human eye takes some time to accommodate to a new focus distance hides this smoothing efficiently. When new gaze convergence distances are added to the temporal low-pass filter, such new gaze convergence distances are further weighed by a gaze-stability value provided by the gaze tracking means. This means that some gaze convergence distances for which the user's gaze is stable may have a higher weight as compared to gaze convergence distances for which the user's gaze is unstable.

It will be appreciated that when the velocity with which the head pose is changing exceeds a predefined threshold velocity, the gaze convergence distance can be considered to be an infinite distance, and then the at least one processor is configured to reproject the remaining region of the given image frame and/or the region of interest of the given image frame using the 3DOF reprojection. This may be because when the velocity with which the head pose is changing exceeds the predefined threshold velocity, the user may not be likely to clearly perceive any visual content represented in the remaining region and/or the region of interest of the given image frame.

The present disclosure also relates to the method as described above. Various embodiments and variants disclosed above, with respect to the aforementioned imaging system, apply mutatis mutandis to the method.

In an embodiment, the step of generating the reprojected image frame comprises reprojecting a remaining region of the given image frame also using the 6DOF reprojection, whilst considering the gaze convergence distance as an optical depth of pixels of the remaining region.

In another embodiment, the step of generating the reprojected image frame comprises reprojecting a peripheral region of the given image frame using three degrees-of-freedom (3DOF) reprojection, the peripheral region surrounding the region of interest. Optionally, the method further comprises:

for a given pixel of an intermediate region of the given image frame that lies between the region of interest and the peripheral region, interpolating between zero and a reciprocal of the gaze convergence distance, to generate a reciprocal of an interpolated distance; and
reprojecting the intermediate region using the 6DOF reprojection, whilst considering interpolated distances as respective optical depths of pixels of the intermediate region.

Optionally, the method further comprises:
determining a gaze position in the given image frame based on the gaze direction of the given eye; and
interpolating between zero and the reciprocal of the gaze convergence distance based on a distance of the given pixel from the gaze position in the given image frame, to generate the reciprocal of the interpolated distance for the given pixel of the intermediate region.

Optionally, when the given image frame represents at least one virtual object, the method further comprises:
capturing, via at least one camera, an image of a real-world environment in which the display apparatus is being used; and
superimposing the at least one virtual object as represented in the reprojected image frame over the captured image, for display at the display apparatus.

Optionally, the method further comprises detecting a boundary of at least one object that is at least partially represented in the region of interest in the given image frame,
wherein the step of generating the reprojected image frame comprises reprojecting a region of the given image frame lying inside the detected boundary of the at least one object, but lying outside the region of interest, also using the 6DOF reprojection, whilst considering the gaze convergence distance as an optical depth of pixels of said region.

Optionally, the method further comprises:
processing pose-tracking data, collected by pose-tracking means, to determine at least one of: a displacement in a head pose of the user, a velocity with which the head pose is changing; and
updating the gaze convergence distance, based on the at least one of: the displacement in the head pose, the velocity with which the head pose is changing.

DETAILED DESCRIPTION OF THE DRAWINGS

Referring to FIG. 2, illustrated is a block diagram of an architecture of an imaging system 200 of a display apparatus 202, the imaging system 200 incorporating gaze-adaptive image reprojection, in accordance with an embodiment of the present disclosure. The imaging system 200 comprises gaze-tracking means 204 and at least one processor (depicted as a processor 206). Optionally, the imaging system 200 comprises at least one camera (depicted as a camera 208) and pose-tracking means 210. The processor 206 is communicably coupled to the gaze-tracking means 204 and optionally, to the camera 208 and the pose-tracking means 210. The processor 206 is configured to perform various operations, as described earlier with respect to the aforementioned first aspect.

It may be understood by a person skilled in the art that FIG. 2 includes a simplified architecture of the imaging system 200, for sake of clarity, which should not unduly limit the scope of the claims herein. It is to be understood that the specific implementation of the imaging system 200 is provided as an example and is not to be construed as limiting it to specific numbers or types of gaze-tracking means, cameras, pose-tracking means, and processors. The person skilled in the art will recognize many variations, alternatives, and modifications of embodiments of the present disclosure.

Figure 1C:
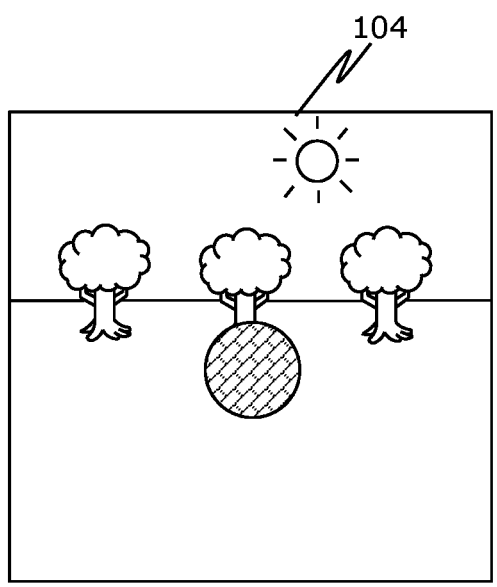
FIG. 1C illustrates an image frame generated corresponding to the first pose of the XR device, while FIG. 1D (Prior Art) illustrates an ideal reprojected image frame generated by reprojecting said image frame.
Figure 3A:
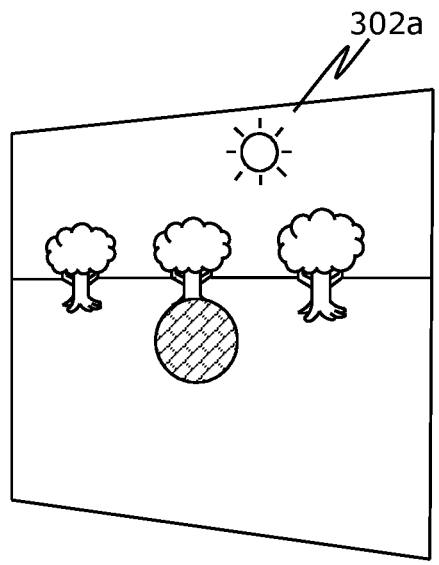
FIGS. 3A, 3B, and 3C illustrate different reprojected image frames generated by reprojecting a region of interest of an image frame using a six degrees-of-freedom (6DOF) reprojection, whilst considering a gaze convergence distance as an optical depth of pixels of the region of interest, in accordance with an embodiment of the present disclosure.
Figure 3B:
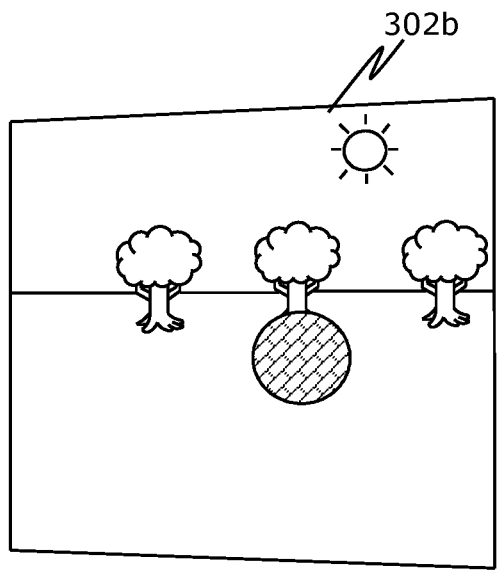
Figure 3C:
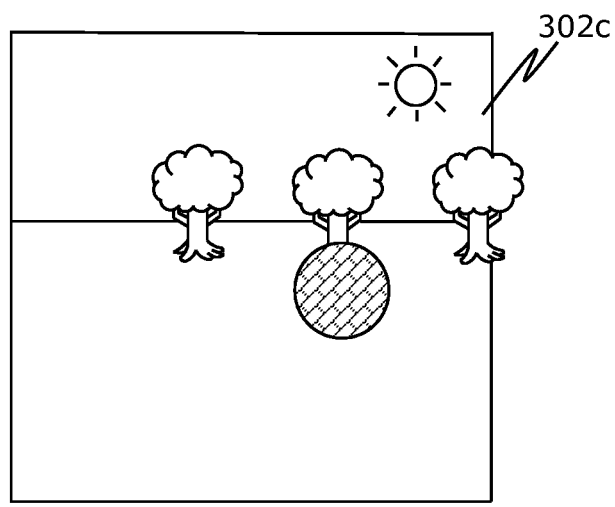

Referring to FIGS. 3A, 3B, and 3C, illustrated are different reprojected image frames 302a-c generated by reprojecting a respective region of interest of the image frame 104 (as depicted in FIG. 1C) using a six degrees-of-freedom (6DOF) reprojection, whilst considering a gaze convergence distance as an optical depth of pixels of the region of interest, in accordance with an embodiment of the present disclosure.

Figure 1D:
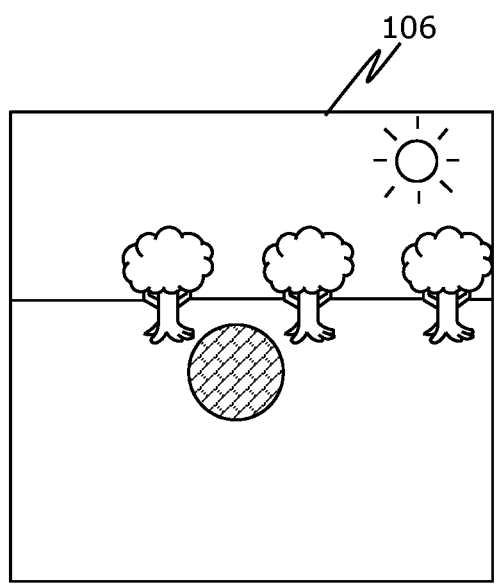
FIG. 1E (Prior Art) illustrates a reprojected image frame generated by reprojecting an image frame using a three degrees-of-freedom (3DOF) reprojection, while FIG. 1F (Prior Art) illustrates a reprojected image frame generated by reprojecting an image frame using a six degrees-of-freedom (6DOF) reprojection.

With reference to FIG. 3A, the reprojected image frame 302a is generated by taking into account that a gaze direction of a given eye of a user is directed towards the object 102a (namely, a nearby object with respect to the user's eyes). The 6DOF reprojection is performed by considering the object 102a represented in the image frame to be at the gaze convergence distance, and remaining objects 102b-c represented in the image frame 104 to be at an infinite distance from the user's eyes. Upon comparing said reprojected image frame 302a with the ideal reprojected image frame 106 (as depicted in FIG. 1D), it can be inferred that the object 102a appears to be well-reprojected, but the remaining objects 102b-c do not appear to be reprojected accurately. However, when the reprojected image frame is displayed to the user, the user would typically focus only on the object 102a that corresponds to the region of interest, and any skewness in a remaining region of the reprojected image frame 302a (representing the objects 102b-c) would be imperceptible (i.e., unnoticeable) to the user.

With reference to FIG. 3B, the reprojected image frame 302b is generated by taking into account that the gaze direction of the given eye of the user is directed towards the object 102b (namely, an object at an intermediate distance from the user's eyes). The 6DOF reprojection is performed by considering the object 102b represented in the image frame to be at the gaze convergence distance, and remaining objects 102a and 102c represented in the image frame to be at an infinite distance from the user's eyes. Upon comparing said reprojected image frame 302b with the ideal reprojected image frame 106 (as depicted in FIG. 1D), it can be inferred that the object 102b appears to be well-reprojected, but the remaining objects 102a and 102c do not appear to be reprojected accurately. However, when the reprojected image frame 302b is displayed to the user, the user would typically focus only on the object 102b that corresponds to the region of interest, and any skewness in a remaining region of the reprojected image frame 302b (representing the objects 102a and 102c) would be imperceptible (i.e., unnoticeable) to the user.

With reference to FIG. 3C, the reprojected image frame 302c is generated by taking into account that the gaze direction of the given eye of the user is directed towards the object 102c (namely, an object that is far from the user's eyes). The 6DOF reprojection is performed by considering the object 102c represented in the image frame to be at the gaze convergence distance, and remaining objects 102a and 102b represented in the image frame to be at an infinite distance from the user's eyes. Upon comparing said reprojected image frame 302c with the ideal reprojected image frame 106 (as depicted in FIG. 1D), it can be inferred that the object 102c appears to be well-reprojected, but the remaining objects 102a and 102b do not appear to be reprojected accurately and resemble with how the objects 102a and 102b appear in the reprojected image frame 108 (as shown in FIG. 1E) wherein the 3DOF reprojection was employed. However, when the reprojected image frame 302c is displayed to the user, the user would typically focus only on the object 102c that corresponds to the region of interest, and any skewness in a remaining region of the reprojected image frame 302c (representing the objects 102a and 102b) would be imperceptible (i.e., unnoticeable) to the user.

FIGS. 3A-3C are merely examples, which should not unduly limit the scope of the claims herein. A person skilled in the art will recognize many variations, alternatives, and modifications of embodiments of the present disclosure.

Figure 4:
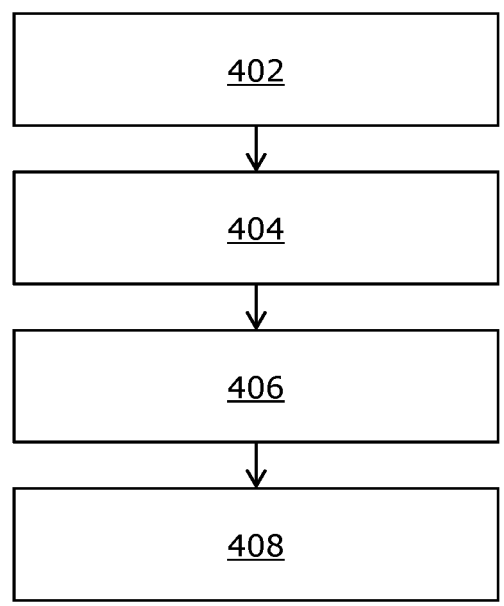
FIG. 4 illustrates steps of a method incorporating gaze-adaptive image reprojection, in accordance with an embodiment of the present disclosure.

Referring to FIG. 4, illustrated are steps of a method incorporating gaze-adaptive image reprojection, in accordance with an embodiment of the present disclosure. At step 402, gaze-tracking data is processed to detect gaze directions of a user's eyes, the gaze-tracking data being collected by gaze-tracking means. At step 404, a gaze convergence distance is determined, based on a convergence of the gaze directions of the user's eyes. At step 406, a region of interest is identified in a given image frame, based on a gaze direction of a given eye of the user from a perspective of which the given image frame is rendered. At step 408, a reprojected image frame is generated by reprojecting the region of interest using six degrees-of-freedom (6DOF) reprojection, whilst considering the gaze convergence distance as an optical depth of pixels of the region of interest.

The aforementioned steps are only illustrative and other alternatives can also be provided where one or more steps are added, one or more steps are removed, or one or more steps are provided in a different sequence without departing from the scope of the claims.

The invention claimed is:

1. An imaging system of a display apparatus comprising:
   gaze-tracking means; and
   at least one processor configured to:
   process gaze-tracking data, collected by the gaze-tracking means, to detect gaze directions of a user's eyes;
   determine a gaze convergence distance, based on a convergence of the gaze directions of the user's eyes;
   identify a region of interest in a given image frame, based on a gaze direction of a given eye of the user from a perspective of which the given image frame is rendered; and
   generate a reprojected image frame, by reprojecting the region of interest using six degrees-of-freedom (6DOF) reprojection, whilst considering the gaze convergence distance as an optical depth of pixels of the region of interest;
   wherein when generating the reprojected image frame, the at least one processor is configured to reproject a peripheral region of the given image frame using three degrees-of-freedom (3DOF) reprojection, the peripheral region surrounding the region of interest.

2. The imaging system of claim 1, wherein when generating the reprojected image frame, the at least one processor is configured to reproject a remaining region of the given image frame also using the 6DOF reprojection, whilst considering the gaze convergence distance as an optical depth of pixels of the remaining region.

3. The imaging system of claim 1, wherein when generating the reprojected image frame, the at least one processor is configured to:
   for a given pixel of an intermediate region of the given image frame that lies between the region of interest and the peripheral region, interpolate between zero and a reciprocal of the gaze convergence distance, to generate a reciprocal of an interpolated distance; and
   reproject the intermediate region using the 6DOF reprojection, whilst considering interpolated distances as respective optical depths of pixels of the intermediate region.

4. The imaging system of claim 3, wherein the at least one processor is configured to:
   determine a gaze position in the given image frame based on the gaze direction of the given eye; and
   interpolate between zero and the reciprocal of the gaze convergence distance based on a distance of the given pixel from the gaze position in the given image frame, to generate the reciprocal of the interpolated distance for the given pixel of the intermediate region.

5. The imaging system of claim 1, further comprising at least one camera, wherein the given image frame represents at least one virtual object, and wherein the at least one processor is configured to:
  capture, via the at least one camera, an image of a real-world environment in which the display apparatus is being used; and
  superimpose the at least one virtual object as represented in the reprojected image frame over the captured image, for display at the display apparatus.

6. The imaging system of claim 1, wherein the at least one processor is configured to detect a boundary of at least one object that is at least partially represented in the region of interest in the given image frame,
  wherein when generating the reprojected image frame, the at least one processor is configured to reproject a region of the given image frame lying inside the detected boundary of the at least one object, but lying outside the region of interest, also using the 6DOF reprojection, whilst considering the gaze convergence distance as an optical depth of pixels of said region.

7. The imaging system of claim 1, further comprising pose-tracking means, wherein the at least one processor is configured to:
  process pose-tracking data, collected by the pose-tracking means, to determine at least one of: a displacement in a head pose of the user, a velocity with which the head pose is changing; and
  update the gaze convergence distance, based on the at least one of: the displacement in the head pose, the velocity with which the head pose is changing.

8. A method comprising:
  processing gaze-tracking data, collected by gaze-tracking means, to detect gaze directions of a user's eyes;
  determining a gaze convergence distance, based on a convergence of the gaze directions of the user's eyes;
  identifying a region of interest in a given image frame, based on a gaze direction of a given eye of the user from a perspective of which the given image frame is rendered; and
  generating a reprojected image frame, by reprojecting the region of interest using six degrees-of-freedom (6DOF) reprojection, whilst considering the gaze convergence distance as an optical depth of pixels of the region of interest;
  wherein the step of generating the reprojected image frame comprises reprojecting a remaining region of the given image frame also using the 6DOF reprojection, whilst considering the gaze convergence distance as an optical depth of pixels of the remaining region.

9. The method of claim 8, wherein the step of generating the reprojected image frame comprises reprojecting a peripheral region of the given image frame using three degrees-of-freedom (3DOF) reprojection, the peripheral region surrounding the region of interest.

10. The method of claim 9, further comprising:
  for a given pixel of an intermediate region of the given image frame that lies between the region of interest and the peripheral region, interpolating between zero and a reciprocal of the gaze convergence distance, to generate a reciprocal of an interpolated distance; and
  reprojecting the intermediate region using the 6DOF reprojection, whilst considering interpolated distances as respective optical depths of pixels of the intermediate region.

11. The method of claim 10, further comprising:
  determining a gaze position in the given image frame based on the gaze direction of the given eye; and
  interpolating between zero and the reciprocal of the gaze convergence distance based on a distance of the given pixel from the gaze position in the given image frame, to generate the reciprocal of the interpolated distance for the given pixel of the intermediate region.

12. The method of claim 8, further comprising detecting a boundary of at least one object that is at least partially represented in the region of interest in the given image frame,
  wherein the step of generating the reprojected image frame comprises reprojecting a region of the given image frame lying inside the detected boundary of the at least one object, but lying outside the region of interest, also using the 6DOF reprojection, whilst considering the gaze convergence distance as an optical depth of pixels of said region.

13. The method of claim 8, further comprising:
  processing pose-tracking data, collected by pose-tracking means, to determine at least one of: a displacement in a head pose of the user, a velocity with which the head pose is changing; and
  updating the gaze convergence distance, based on the at least one of: the displacement in the head pose, the velocity with which the head pose is changing.

* * * * *